United States Patent [19]

Takahashi et al.

[11] Patent Number: 5,510,463

[45] Date of Patent: Apr. 23, 1996

[54] PROCESS FOR PRODUCING ZEIN

[75] Inventors: Hidekazu Takahashi; Norimasa Yanai, both of Chiba, Japan

[73] Assignee: Showa Sangyo Co., Ltd., Tokyo, Japan

[21] Appl. No.: 172,078

[22] Filed: Dec. 23, 1993

[30] Foreign Application Priority Data

Dec. 25, 1992 [JP] Japan ..................................... 4-346082

[51] Int. Cl.$^6$ ..................................................... A23J 1/12
[52] U.S. Cl. ........................... 530/373; 530/372; 530/374; 530/376; 426/96; 426/656
[58] Field of Search ..................................... 530/373, 372, 530/374, 376; 426/96, 656

[56] References Cited

U.S. PATENT DOCUMENTS

| | | | |
|---|---|---|---|
| 3,535,305 | 10/1970 | Carter et al. | 530/373 |
| 5,021,248 | 6/1991 | Stark et al. | 426/96 |
| 5,254,673 | 10/1993 | Cook et al. | 530/373 |
| 5,342,923 | 8/1994 | Takahashi et al. | 530/373 |
| 5,367,055 | 11/1994 | Takahashi et al. | 530/373 |

FOREIGN PATENT DOCUMENTS

| | | |
|---|---|---|
| 0510537 | 10/1992 | European Pat. Off. . |
| 0551553 | 7/1993 | European Pat. Off. . |
| 63-185999 | 8/1988 | Japan .............................. C07K 15/00 |
| 5030919 | 2/1993 | Japan . |
| 5030918 | 2/1993 | Japan . |
| 0604745 | 7/1948 | United Kingdom . |

*Primary Examiner*—Chhaya D. Sayala
*Attorney, Agent, or Firm*—Sughrue, Mion, Zinn, Macpeak & Seas

[57] ABSTRACT

A process in which treatment conditions in the extraction steps of the corn protein, zein, are stabilized and by which decolorized and purified zein can be provided in a stable manner through continuous treatment steps, while simultaneously providing techniques for the concentration and recovery of corn pigment components. Corn gluten meal is treated with a hydrocarbon solvent having 5 to 9 carbon atoms. Zein and pigment components are extracted from the treated corn gluten meal with a solvent, such as about 91 to 96% by volume ethanol, and zein and the pigment components are separated from the resulting extract solution. Oil and fat components and pigment components may be extracted from corn gluten meal prior to the zein extraction steps.

6 Claims, No Drawings

PROCESS FOR PRODUCING ZEIN

FIELD OF THE INVENTION

This invention relates to a process for the production of the corn protein "zein". More particularly, it relates to a process for producing decolorized zein in a stable manner and recovering corn pigment which has not been recovered in the conventional zein production processes.

BACKGROUND OF THE INVENTION

Zein is a principal component of corn protein. Because of its various excellent characteristics, a number of applications or uses of zein have been developed. However, there is an increasing demand for a purified white zein product free from undesirable color and odor, which can therefore be used in food and cosmetics.

Conventional processes for the production of zein include: (1) a process in which zein is extracted using a water-containing solvent, and the resulting extract solution is cooled to precipitate and recover zein while pigment and odor components remain dissolved in the extract solution (see JP-B-16800, the term "JP-B" as used herein means an "examined Japanese patent publication"); (2) a process in which zein is extracted using water-containing ethanol under weak alkaline conditions, concentrated at reduced pressure and then contacted with cool water to recover it as a water insoluble component (see JP-A-63-185999, the term "JP-A" as used herein means an "unexamined published Japanese patent application"); and (3) a process in which a zein solution is contacted with acetone, cold alcohol and the like, and the resulting insolubilized zein is recovered and dried (see U.S. patent application No. 07/874,864 filed on Apr. 28, 1992 now U.S. Pat. No. 5,342,923).

In the first process, zein is precipitated due to its lack of solubility in solution. However, a solvent having a high ability to extract zein (i.e., a high water content solvent) cannot insolubilize and precipitate zein selectively during the cooling step and may cause insolubilization of not only zein but also pigment and oil fractions, thus causing difficulty in obtaining purified zein. This process is also disadvantageous in that partly dissolved zein remaining in the supernatant fluid causes yield loss and the precipitation step requires a prolonged period of time.

In the second process, zein may be subject to thermal denaturation during the concentration of the zein solution extracted with the water-containing solvent and during precipitation and drying due to a relative increase in the water content of the precipitate.

In the third process, pigment and oil components can be removed from zein, but the process cannot be practically used for the selective recovery of pigment.

On the other hand, processes have been proposed by the inventors of the present invention in U.S. Pat. application No. 07/868,907 filed on Apr. 16, 1992, now U.S. Pat. No. 5,367,055 and JP-A-5-30919 conceiving the removal of pigment. In these processes, the pigment components, which are difficult to extract, are extracted using acetone and alcohol, which contain water in a small amount such that zein is not extracted, and a mixed solvent thereof and by allowing the corn gluten meal to swell slightly. This, however, is a treatment process for obtaining pigment-free zein and not a recovery process for obtaining practically useful pigment. That is, since whole oil and fat components are extracted together with the pigment, the resulting product has a thin color density and therefore cannot be put into practical use as a pigment preparation for use in food, cosmetics and the like.

When extraction of zein from corn gluten meal is carried out using a solvent having a relatively high water content (for example, an aqueous solution of less than 91% ethanol), the swelling degree and other properties of the corn gluten meal during the extraction vary depending on the quality of the corn gluten meal used, thus causing great variation in the properties of the extracted solution and altering the operation of the filtration and centrifugation steps. Because of this, it becomes necessary to control the extraction conditions depending on the properties of each corn gluten meal material.

This invention has been made, taking the aforementioned problems involved in the conventional zein production processes into consideration, with the aim of providing a process in which treatment conditions during extraction of zein are stabilized and decolorized and purified zein is provided through continuous treatment steps, as well as a process for the recovery by concentration of corn pigment having a bright yellow color, the pigment being useful in food and the like.

In view of the above, the inventors of the present invention have conducted intensive studies on the development of a process in which treatment conditions during the extraction of zein are stabilized so that continuous treatment can be conducted, and a process by which production of zein and concentration of pigment can be made simultaneously. The inventors have found a process by which extraction of zein can be made without causing swelling of corn gluten meal, the processes being carried out by the use of water-containing alcohol and water-containing acetone having lower water contents in comparison with those in conventional extraction processes at a higher temperature in comparison with the conventional process and by the separation of residual materials. According to the invention, extraction of zein can be carried out within a short period of time without causing deterioration of product quality, the product not being influenced by the quality of corn gluten meal used as the starting material.

In the extraction process of the present invention, however, oils and fats and impurities may also be extracted in high quantities together with zein because of the low water content of the extraction solvent and high extraction temperature in comparison with conventional processes. Because of this, when zein is precipitated and recovered by cooling the extract solution, a small amount of a water-containing solvent may be added to the precipitate to separate insoluble components by filtration. Oil and fat components remain in the solution and form minute oil droplets during the filtration separation step. Being minute in size, these oil droplets have a tendency to pass through a filter together with the solution. On the other hand, when an extremely fine mesh filter, such as an ultrafiltration membrane, is used to prevent such a problem, it causes another problem in that filtration resistance and blinding (the meshes of filter are stopped up) occur, thus entailing extremely reduced filtration efficiency. When oils and fats remain in the filtration step, it also causes a problem in that the pigment component dissolves in oils and fats remaining in the zein precipitate and causes dense coloring of zein, thus accelerating the change in quality of a zein solution.

In consequence, the inventors of the present invention have further examined these problems and found that, when a pretreatment step is employed using a solvent discussed below, oils and fats which have caused problems in the subsequent purification steps can be removed in advance from corn gluten meal, and the pigment remains in a relatively high quantity in the treated corn gluten meal. On the other hand, examination was made also of the use of gluten meal from which oil and fat and pigment components have been removed by the process disclosed in U.S. Pat. application No. 07/868,907 filed on Apr. 16, 1992 and JP-A-5-30919 in which acetone and alcohol which contain water in a reduced amount, such that zein is not extracted, and a mixed solvent thereof is used.

SUMMARY OF THE INVENTION

One object of the present invention is to provide a process in which corn gluten meal from which oil and fat components and pigment components, or only oil and fat components, have been removed by extraction in advance is used as the starting material and zein is extracted therefrom. The extraction is carried out at a temperature higher than in conventional processes using a solvent having a lower water content in comparison with conventional zein extraction conditions. The process of the invention includes the steps of treating corn gluten meal with a hydrocarbon solvent having 5 to 9 carbon atoms, extracting zein and pigment components from the treated corn gluten meal, and separating the zein and the pigment components in the resulting extract solution from each other.

Another object of the present invention is to provide a process for the production of zein which includes the step of treating corn gluten meal with a hydrocarbon solvent having 5 to 9 carbon atoms, as mentioned above, and then extracting zein and pigment components from the treated corn gluten meal at a temperature of at least 60° C. using a high concentration, high temperature solvent which is either a solvent comprising about 91 to 96% by volume ethanol, a solvent comprising about 86 to 95% by volume isopropanol, a solvent comprising about 81 to 91% by volume acetone, or mixtures thereof. The extract solution is cooled to a temperature equal to or lower than ordinary or room temperature (about 25° C.) thereby recovering zein as a precipitate while allowing the pigment components to remain dissolved in the extract solution.

A further object of the present invention is to provide a process for the production of zein which includes the step of treating corn gluten meal with one or more solvents to remove by extraction oil, fat and pigment from the corn gluten meal. The solvents for this step include a solvent comprising about 92 to 98% by volume acetone; a solvent comprising about 95 to 100% by volume ethanol; and a mixed solvent comprising hexane and ethanol, the mixed solvent comprising about 3 to 50% by volume aqueous ethanol, the aqueous ethanol comprising about 80 to 95% by volume ethanol. The zein in the treated corn gluten meal is extracted at a temperature of at least 60° C. using the high concentration, high temperature solvent mentioned above and discussed below. The extract solution is cooled to a temperature up to ordinary or room (about 25° C.) temperature thereby recovering zein as a precipitate.

Other objects and advantages of the present invention will be apparent from the following description of the same.

DETAILED DESCRIPTION OF THE INVENTION

In the process of the present invention, the step of treating the corn gluten meal with a hydrocarbon solvent is employed to selectively extract oils and fats. Any suitable hydrocarbon containing saturated or unsaturated bonds and having a straight, branched, circular or branch-attached circular structure may be used for this purpose, provided that it has 5 to 9 carbon atoms, preferably 5 or 6 carbon atoms. The typical examples of the hydrocarbon solvent include pentane, methylpentane, methylcyclopentane, cyclohexane, n-hexane, and the like.

Extraction of the oil and fat components can be effected by contacting the corn gluten meal in a continuous or batch wise manner with a solvent which is used in an amount equivalent to or larger than the volume of corn gluten meal and also equivalent to or larger than the steepable volume (a volume capable of being steeped in the corn gluten meal). In some cases, however, when heated, corn gluten meal swells due to water contained in the corn gluten meal itself, thus causing severe elution of the pigment.

In this oil and fat extraction step, neutral lipids such as triglycerides, diglycerides, monoglycerides, free fatty acids and the like are mainly extracted. However, pigments contained in the corn gluten meal, such as carotene, xanthophyll, and the like, are likely to remain in the corn gluten meal because of their relatively low extractability.

In the subsequent step of extracting zein and pigment from the corn gluten meal, zein is extracted using a water-containing alcohol or water-containing acetone having a low water content in comparison with a conventional zein extraction step and at a relatively high temperature. Thereafter, the residue in the resulting extract solution is separated and the extract solution is cooled to recover zein as a precipitate. The thus recovered zein does not cause formation of minute oil droplets in a subsequent treatment step and has less yellowish color tone. On the other hand, pigment components are concentrated in the supernatant fluid. The thus concentrated pigment composition has a bright yellow color and can be used in food processing and the like.

In the zein and pigment extraction step, a solvent having a lower water content in comparison with the conventional process is used, as mentioned above. When ethanol is used as such a solvent, an ethanol concentration of about 91 to 96%, preferably 93 to 95%, is used in the present invention. All percentages expressed herein are volume percentages unless stated otherwise. This is in contrast to an ethanol concentration of 60 to 90% used in the conventional processes. Similarly, a solvent containing about 86 to 95% isopropanol may be used in this step of the present invention. Conventionally, a solvent containing 55 to 85% isopropanol is used in such a step. Also, a solvent containing about 81 to 91% acetone may be used in this step of the present invention. Conventionally, a solvent containing 60 to 80% acetone is used.

In addition, it is desirable, as mentioned above, to carry out the zein and pigment extraction at a relatively high temperature in comparison with conventional processes. The temperature may be in the range of from the boiling point of the solvent used to a temperature about 30° C. below the boiling point, preferably at least 60° C. For example, when an ethanol solvent is used, the temperature preferably is in the range of from 60 to 80° C.

In another step in accordance with the invention, oil and fat components and pigment components are extracted and removed from corn gluten meal using acetone, alcohol or a mixed solvent thereof containing a small amount of water such that zein is not extracted. This step is different from the pretreatment step discussed above in which a hydrocarbon solvent having 5 to 9 carbon atoms is used. In order to extract the oil and fat components and pigment components, it is desirable to use a solvent containing either about 92 to 98% acetone, about 95 to 100% ethanol or a mixed solvent comprising hexane and ethanol, the mixed solvent comprising about 3 to 50% by volume aqueous ethanol, the aqueous ethanol comprising about 80 to 95% by volume ethanol.

In this treatment step, whole oil and fat components are extracted and removed together with a large quantity of pigment components which therefore are substantially removed from the treated corn gluten meal.

The following examples are provided to further illustrate the present invention. It is to be understood, however, that the examples are for purpose of illustration only and are not to be construed to limit the scope of the invention.

EXAMPLE 1

A 500 ml portion of n-hexane was added to 100 g of corn gluten meal (Shikishima Starch Co., Ltd.) and the mixture was subjected to steeping by allowing it to stand still overnight at room temperature, thereafter removing hexane solution. The hexane solution contained 3.1 g of oily solid substances having a slightly yellow color. Next, 800 ml of 95% ethanol was added to the remaining corn gluten meal and mixed for 15 minutes in a homogenizer arranged in a water bath having a temperature of 70° C. The resulting mixture was centrifuged at 2,500 rpm for 2 minutes at the same temperature to obtain a light yellow and transparent zein extract.

The thus obtained extract was cooled to −10° C. to cause precipitation of zein and then subjected to solid-liquid separation by decantation to obtain 47.2 g of a precipitate. When 85% ethanol was added to this precipitate to a total weight of 100 g, a clear zein solution (solid content, 21.1%) was obtained.

On the other hand, when the supernatant ethanol solution resulting from the solid-liquid separation was dried by evaporation and the resulting solid material was extracted with acetone, 0.41 g of a yellow oily material was obtained. When the oily material extracted with hexane and the oily material extracted with acetone were separately dissolved in 95% ethanol to a final concentration of 0.2% and checked for their absorption spectra, peaks which indicate the presence of pigment components were not found within the visible region in the case of the hexane-extracted oily material, while the acetone-extracted oily material revealed absorption peaks at around 420, 450 and 470 nm. The thus concentrated pigment composition was bright yellow in color and useful for food processing and the like purposes.

COMPARATIVE EXAMPLE 1

A 800 ml portion of 95% ethanol was added to 100 g of corn gluten meal (Shikishima Starch Co., Ltd.) and mixed for 15 minutes in a homogenizer arranged in a water bath at a temperature of 70° C. The resulting mixture was centrifuged at 2,500 rpm for 2 minutes at the same temperature to obtain a zein extract in the form of an emulsion.

The thus obtained extract was cooled to −10° C. to cause precipitation of zein and then subjected to solid-liquid separation by decantation to obtain 50.4 g of a precipitate. When 85% ethanol was added to this precipitate to a total weight of 100 g, an emulsified zein solution (solid content, 25.1%) was obtained. This solution formed yellow oil droplets when stored in a refrigerator.

On the other hand, when the supernatant ethanol solution resulting from the solid-liquid separation was dried by evaporation, un-precipitated zein and yellow oily materials remained as a variegated residue. When the residue was extracted with acetone, 1.62 g of a yellow oily material was obtained.

When the oily material was dissolved in 95% ethanol to a final concentration of 0.2% and checked for its absorption spectrum, peaks were smaller than those obtained for the acetone-extracted oily material in Example 1, thus showing smaller pigment content.

EXAMPLE 2

A 500 ml portion of n-hexane was added to 100 g of corn gluten meal (Shikishima Starch Co., Ltd.), and the mixture was homogenized and then subjected to 1 hour of reflux extraction in a boiling water bath. After cooling, hexane solution was separated by filtration. This hexane solution contained 3.9 g of oily solid substances having a slightly yellow color. Next, 800 ml of 95% ethanol was added to the remaining corn gluten meal and mixed for 15 minutes in a homogenizer arranged in a water bath of 70° C. The resulting mixture was centrifuged at 2,500 rpm for 2 minutes at the same temperature to obtain a light yellow and transparent zein extract.

The thus obtained extract was cooled to −10° C. to cause precipitation of zein and then subjected to solid-liquid separation by decantation to obtain 44.6 g of a precipitate. When 85% ethanol was added to this precipitate to a total weight of 100 g, a clear zein solution (solid content, 20.0%) was obtained.

On the other hand, when the supernatant ethanol solution resulting from the solid-liquid separation was dried by evaporation, un-precipitated zein remained as an orange-colored solid material. When the solid material was extracted with acetone, 1.34 g of an orange-colored material was obtained. When the hexane-soluble oily material and the material extracted with acetone were separately dissolved in 95% ethanol to a final concentration of 0.2% and checked for their absorption spectra, absorption peaks were found at around 420, 450 and 470 nm in both solutions, but the absorption peaks of the hexane-soluble material were less than half the absorption peaks of the acetone-soluble material. The thus concentrated pigment composition was useful for food processing and the like purposes.

EXAMPLE 3

A 40 liter portion of 98% acetone was added to 5 kg of corn gluten meal (Shikishima Starch Co., Ltd.) and the mixture was subjected to overnight steeping. After removing acetone by filtration, 40 liters of 82% acetone was added to the remaining corn gluten meal and subjected to 1 hour of extraction with stirring at 60° C. A portion of the resulting mixture was centrifuged at 2,500 rpm for 2 minutes to obtain a light yellow and transparent zein extract. The entire portion of the thus obtained extract was cooled to −30° C. to cause precipitation of zein and then subjected to solid-liquid separation by decantation to obtain 3.42 kg of a precipitate.

The precipitate was then subjected to vacuum drying to obtain 1.22 kg of zein. When 3 g of the thus obtained zein was dissolved in 100 ml of 85% ethanol, a transparent zein solution was obtained.

COMPARATIVE EXAMPLE 2

A 800 ml portion of 82% acetone was added to 100 g of corn gluten meal (Shikishima Starch Co., Ltd.) and the mixture was subjected to 1 hour of extraction with shaking at 60° C. and then centrifuged at 7,000 rpm for 10 minutes to obtain a zein extract but only in the form of a solution containing an oily emulsion. Next, the thus obtained extract was cooled to −30° C. to cause precipitation of zein and then subjected to solid-liquid separation by decantation to obtain 51.4 g of a precipitate. The precipitate was then subjected to vacuum drying to obtain 2.19 g of zein. When 0.3 g of the thus obtained zein was dissolved in 10 ml of 85% ethanol, the zein solution obtained was not transparent.

In accordance of the present invention, there has been provided a process for the production of zein in which corn gluten meal, from which oil and fat components and pigment components, or only oil and fat components were removed by extraction in advance, is used as the starting material. Zein is extracted therefrom at a temperature higher than in conventional process using a solvent having a lower water content in comparison with conventional zein extraction conditions.

In accordance with the present invention, treatment conditions during the extraction of zein can be stabilized by reducing the influence of the quality of the corn gluten meal used as the starting material. Decolorized and purified zein can be provided in a stable manner through continuous treatment steps without causing formation of minute oil droplets. Techniques by which extraction of zein can be effected within a short period of time without causing deterioration of the product quality can be employed in the present invention. Also, corn pigment components can be concentrated and recovered simultaneously with the recovery of zein, and the concentrated pigment composition having a bright yellow color can be used for food processing and the like purposes.

While the invention has been described in detail and with reference to specific embodiments thereof, it will be apparent to one skilled in the art that various changes and modifications can be made therein without departing from the spirit and scope thereof.

What is claimed is:

1. A process for producing zein, comprising the steps of (a) treating corn gluten meal with a hydrocarbon solvent having 5 to 9 carbon atoms to extract oil and fat from the corn gluten meal and form a treated corn gluten meal; (b) extracting the zein and pigment from the treated corn gluten meal using an extraction solvent to form an extract solution containing the zein and the pigment; and (c) separating the zein and the pigment, wherein if said extraction solvent is ethanol, it comprises 93 to 95% by volume ethanol.

2. The process of claim 1, wherein step (b) comprises extracting the zein and the pigment using at least one extraction solvent selected from the group consisting of a solvent comprising 93 to 95% by volume ethanol, a solvent comprising 86 to 95% by volume isopropanol and a solvent comprising 81 to 91% by volume acetone.

3. The process of claim 1, wherein step (b) comprises extracting the zein and the pigment at a temperature of from at least 60° C. to the boiling point of the extraction solvent.

4. The process of claim 1, wherein said hydrocarbon solvent is selected from the group consisting of pentane, methylpentane, methylcyclopentane, cyclohexane, and n-hexane.

5. A process for producing zein, comprising the steps of: (a) treating corn gluten meal with a hydrocarbon solvent having 5 to 9 carbon atoms to form a treated corn gluten meal; (b) extracting the zein and pigment from the treated corn gluten meal using an extraction solvent to form an extract solution containing the zein and the pigment, the extraction being carried out at a temperature of from at least 60° C. to the boiling point of the extraction solvent, using at least one extraction solvent selected from the group consisting of a solvent comprising 93 to 95% by volume ethanol, a solvent comprising 86 to 95% by volume isopropanol and a solvent comprising 81 to 91% by volume acetone; and (C) cooling the extract solution to a temperature up to 25° C., thereby recovering zein as a precipitate while allowing the pigment to remain dissolved in the extract solution.

6. The process of claim 5, wherein said hydrocarbon solvent is selected from the group consisting of pentane, methylpentane, methylcyclopentane, cyclohexane, and n-hexane.

* * * * *